Feb. 24, 1970  E. R. HILL ET AL  3,497,293
COMBINED SEAT-WALKING STICK AND PERISCOPE
Filed Aug. 21, 1967
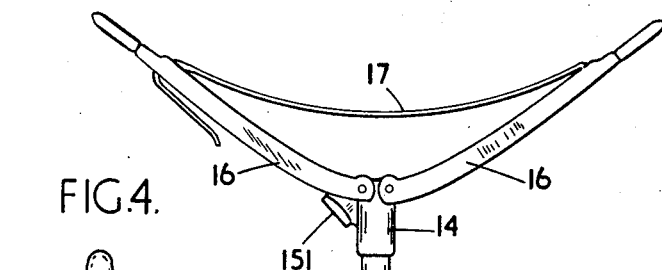
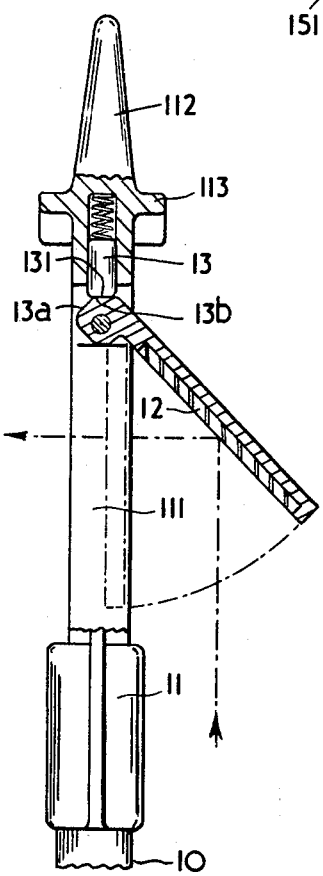
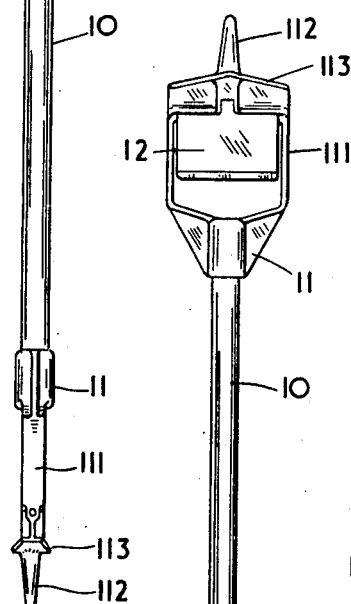
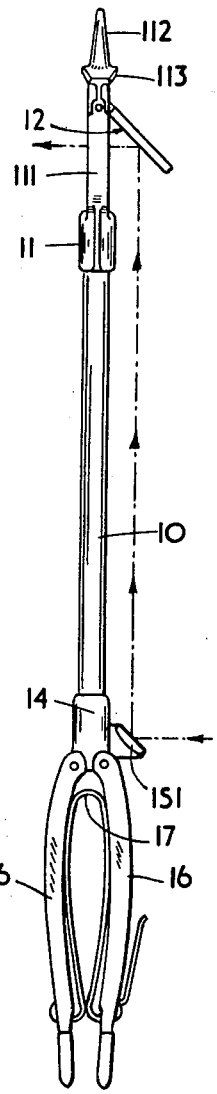

United States Patent Office 3,497,293
Patented Feb. 24, 1970

3,497,293
COMBINED SEAT-WALKING STICK AND PERISCOPE
Eric Ralph Hill, 1 Squires Walk, Wednesbury, Staffordshire, England, and Clifford Davis, 16 Fairyfield Ave., Great Barr, Birmingham 22a, England
Filed Aug. 21, 1967, Ser. No. 661,916
Int. Cl. G02b 23/08
U.S. Cl. 350—301                                1 Claim

ABSTRACT OF THE DISCLOSURE

This invention has reference to a combination article comprising a seat-walking stick which is provided adjacent to the bottom end of the stick with an objective reflecting surface and which is provided adjacent to the seat end of the stick with a viewing reflecting surface, and in which provision is made for setting and retaining the objective reflecting surface in an objective reflecting position when required, and of locating the said objective reflecting surface in an out of action position when not required for object viewing purposes.

BACKGROUND

There is well known in commerce an article known colloquially as a "shooting" or "seat" stick which consists of a stick provided at one end with a spike to be driven into the ground and at the other end with handle sections which are hinged to the stick and interconnected by a strip of flexible material and capable of being opened out to constitute a seat. Such sticks although known colloquially as shooting or seat sticks are also used by people attending horse racing meetings, motor racing meetings, and other spectacles where seats are not normally available.

OBJECTIVE

Viewers even when equipped with a seat-walking stick for comfort whilst watching a sporting event or other spectacle may find it difficult owing to their location in a crowd to view the event or spectacle with comfort and the present invention has for its object to provide a seat-walking stick of the aforesaid kind which serves not only as a seat when required but which may be used as a periscope for viewing events or spectacles over the heads of a crowd without detracting from the utility of the seat-walking stick as an aid to walking and as a seat.

DESCRIPTION

An embodiment of the invention will now be described with particular reference to the accompanying drawings, in which:

FIGURE 1 is a front elevation of the combination article opened out to serve as a seat.

FIGURE 2 is a side elevation of the combination article ready for use as a periscope.

FIGURE 3 is a rear elevation of the combined article when used as a periscope.

FIGURE 4 is a fragmentary view partly in section and partly in elevation on an enlarged scale illustrative of the means and manner of operation of the means for retaining the objective reflecting mirror in one or other of the permitted positions.

In the drawings like numerals of reference denote similar parts in the several views.

According to the illustrated embodiment of the invention the combination seat-walking stick and periscope incorporates a "stick" 10 which conveniently is formed from a length of a light metal alloy tube. Adjacent to the bottom end, when used as a seat or walking stick, the length of tube 10 has secured thereto a fitment 11 hereinafter termed the bottom fitment 11 the inner end portion of which incorporates a frame 111 of skeleton rectangular formation whilst the opposite end portion is formed as a spike 112 in the manner of a conventional seat-walking stick.

Intermediate to its ends the bottom fitment 11 is provided with an integral depth penetration limiting plate 113.

Mounted within the skeleton frame 111 aforesaid is a framed rectangular mirror 12 which is hinged along the bottom side of the mirror frame 111. The bottom of the mirror frame 111 is provided with flats 13a and 13b which co-operate with the nose 131 of a spring pressed plunger 13 which is axially displaceable within a socket formed in the bottom fitment.

The co-operation between the nose 131 of the said plunger 13 and flats 13a, 13b is such that when the nose 131 of the plunger 13 is in contact with the flat 13a the mirror 12 is housed completely within the skeleton frame 111 of the bottom fitment 11 and so guarded against damage and so that when the plunger 13 is snapped into engagement with the other flat 13b the mirror 12 is inclined at the requisite angle for serving as the objective mirror of a periscope.

Welded to the upper end of the length of tube 10 aforesaid is a fitment 14 hereinafter termed the upper fitment 14 incorporating a laterally projecting frame 151 for a fixed rectangular mirror 15 which serves as a viewing mirror. Conveniently the viewing mirror 15 and its frame 151 are permanently set relatively to the upper fitment 14 but if desired the viewing mirror 15 may co-operate with a plunger as in the case of the objective mirror 12 so that the viewing mirror 15 may be moved into a frame when not required for use.

Hinged to the upper fitment 14 are the conventional substantially segmental skeleton sections 16 which are connected by a strip of leather 17 the said substantially segmental skeleton sections 16 being capable of being folded inwardly to serve as the handle of the stick, see FIGURES 2 and 3, and outwardly to provide a seat, see FIGURE 1.

Conveniently the substantially segmental skeleton sections 16 when folded may serve as handles for elevating the stick for use as a periscope and for holding the stick when so used, see FIGURES 2 and 3.

The viewing mirror 12 also may be provided with a screen not shown for the purpose not only of giving added protection to the viewing mirror but also to serve as an anti-glare shade during viewing to prevent glare.

It will be appreciated that with the objective mirror 12 positioned within its frame 111 or with both mirrors in their respective frame if both mirrors are adjustable, that the stick may be used as a ordinary seat-stick and that when required to be used as a periscope it is only necessary to move the objective mirror 12 into position out of the frame and likewise if necessary to position the viewing mirror the stick can be elevated by means of the handles and used as a periscope.

Having thus disclosed our invention what we claim as new and desire to secure by Letters Patent is:

1. A combination article constituting a seat, a walking stick and a periscope comprising in combination:
    (a) an elongated strut means,
    (b) a first end means secured to a first end of the elongated strut means,
    (c) a pair of arms pivotally connceted to said first end means and pivotable between handle positions substantially parallel to and extending away from said strut means and seat positions substantially transverse to said strut means to opposite sides thereof,
    (d) a second end means secured to the second end of the elongated strut means, (e) a frame portion and a ground engaging portion forming parts of said second end means,
(f) a first light reflecting means mounted with respect to said first end member at an inclination thereto,
(g) a second light reflecting means pivotally mounted in said frame portion of said second end means and pivotal between a position within said frame portion in a plane substantially parallel to said strut means and an inclined position, wherein said second end means incorporates a detent mechanism adapted to cooperate with said second reflecting means to hold it positively either in said inclined position or said position parallel to said strut means,
(h) the inclination of the first reflecting means and the inclination of the second reflecting means in its inclined position being such that the first and second reflecting means cooperate to form the viewing mirror and objective mirror respectively of a periscope.

References Cited

UNITED STATES PATENTS

| | | | |
|---|---|---|---|
| 474,240 | 5/1892 | Golding | 248—155 |
| 1,456,304 | 5/1923 | Fritschka | 248—155 |
| 2,360,494 | 10/1944 | Helgason | 350—301 |

FOREIGN PATENTS 101,826   1916   Great Britain.

DAVID SCHONBERG, Primary Examiner

MICHAEL J. TOKAR, Assistant Examiner